United States Patent
Le Ny et al.

(10) Patent No.: US 11,104,598 B2
(45) Date of Patent: Aug. 31, 2021

(54) OVERPRESSURE-ASSISTED GRAVITY BENDING METHOD AND DEVICE SUITABLE THEREFOR

(71) Applicant: SAINT-GOBAIN GLASS FRANCE, Courbevoie (FR)

(72) Inventors: Jean-Marie Le Ny, Gemmenich (BE); Michael Balduin, Alsdorf (DE); Guenther Schall, Kreuzau (DE); Lothar Schmidt, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 713 days.

(21) Appl. No.: 15/736,293

(22) PCT Filed: Oct. 28, 2016

(86) PCT No.: PCT/EP2016/076072
§ 371 (c)(1),
(2) Date: Dec. 13, 2017

(87) PCT Pub. No.: WO2017/089070
PCT Pub. Date: Jun. 1, 2017

(65) Prior Publication Data
US 2018/0170790 A1    Jun. 21, 2018

(30) Foreign Application Priority Data
Nov. 25, 2015   (EP) .................................... 15196183

(51) Int. Cl.
*C03B 23/035* (2006.01)
*C03B 23/025* (2006.01)
(52) U.S. Cl.
CPC ...... *C03B 23/0355* (2013.01); *C03B 23/0256* (2013.01)

(58) Field of Classification Search
CPC combination set(s) only.
See application file for complete search history.

(56) References Cited

U.S. PATENT DOCUMENTS

| | | | |
|---|---|---|---|
| 3,114,571 A | 12/1963 | Carson et al. | |
| 3,473,909 A | 10/1969 | Bennett et al. | |

(Continued)

FOREIGN PATENT DOCUMENTS

| | | |
|---|---|---|
| CA | 2861707 A1 | 9/2013 |
| CN | 1130600 A | 9/1996 |

(Continued)

OTHER PUBLICATIONS

Written Opinion for PCT Application No. PCT/EP2016/076072 filed on Oct. 28, 2016 on behalf of Saint-Gobain Glass France. dated Jan. 13, 2017. 12 pages. (English translation + German original).

(Continued)

*Primary Examiner* — Jodi C Franklin
(74) *Attorney, Agent, or Firm* — Pillsbury Winthrop Shaw Pittman LLP

(57) ABSTRACT

A device and method for bending a glass pane. The device includes a gravity bending mould with a supporting surface, which is suitable for arranging a glass pane thereon; and an upper shaping tool arranged opposite the supporting surface. The upper shaping tool is suitable for producing an overpressure on the top surface of the glass pane arranged on the supporting surface. The top surface faces away from the supporting surface. The shaping tool has a cover that forms a hollow space open in the direction of the gravity bending mould and is equipped with means for introducing a gas into the hollow space in order to produce the overpressure. The hollow space is divided by a separating wall into two subspaces such that a different pressure can be produced in two regions of the surface. The shaping tool is equipped with (Continued)

Figure 1:
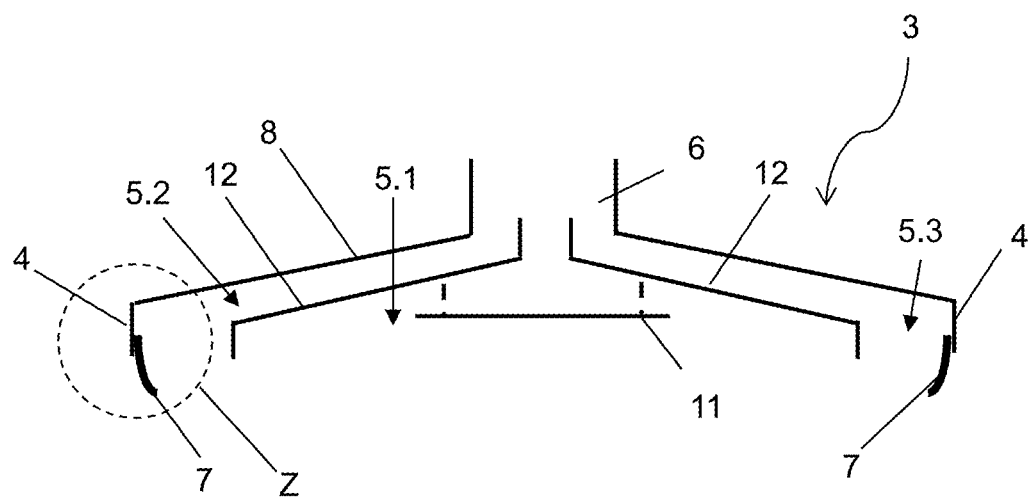

a common gas feed line, and the separating wall extends to the common gas feed line.

15 Claims, 4 Drawing Sheets

(56) References Cited

U.S. PATENT DOCUMENTS

| | | | |
|---|---|---|---|
| 3,778,244 A | | 12/1973 | Nedelec et al. |
| 4,115,090 A | | 9/1978 | Comperatore et al. |
| 4,229,199 A | | 10/1980 | Seymour et al. |
| 4,233,050 A | | 11/1980 | Comperatore et al. |
| 4,504,109 A | | 3/1985 | Taga et al. |
| 4,507,547 A | | 3/1985 | Taga et al. |
| 4,511,386 A | | 4/1985 | Kellar et al. |
| 4,666,492 A | | 5/1987 | Thimons et al. |
| 4,678,495 A | | 7/1987 | Yoshizawa et al. |
| 4,709,988 A | | 12/1987 | Kai et al. |
| 4,738,704 A | | 4/1988 | Vanaschen et al. |
| 4,764,196 A | | 8/1988 | Boutier et al. |
| 4,877,437 A | | 10/1989 | Nitschke |
| 4,910,088 A | | 3/1990 | Baudin et al. |
| 4,952,227 A | | 8/1990 | Herrington et al. |
| 5,057,265 A | | 10/1991 | Cornils et al. |
| 5,135,558 A | * | 8/1992 | Petitcollin ............ C03B 23/0357 65/106 |
| 5,203,905 A | | 4/1993 | Kuster et al. |
| 5,285,660 A | | 2/1994 | Petitcollin et al. |
| 5,328,496 A | | 7/1994 | Lesage et al. |
| 5,376,158 A | | 12/1994 | Shetterly et al. |
| 5,421,940 A | | 6/1995 | Cornils et al. |
| 5,492,951 A | | 2/1996 | Beyrle et al. |
| 5,660,609 A | | 8/1997 | Muller et al. |
| 5,669,952 A | | 9/1997 | Claassen et al. |
| 5,713,976 A | | 2/1998 | Kuster et al. |
| 5,769,919 A | | 6/1998 | Claassen et al. |
| 5,833,729 A | | 11/1998 | Meunier et al. |
| 5,938,810 A | | 8/1999 | De et al. |
| 6,076,373 A | | 6/2000 | Grodziski |
| 6,138,477 A | | 10/2000 | Morin |
| 6,309,755 B1 | | 10/2001 | Matsco et al. |
| 6,318,125 B1 | * | 11/2001 | Diederen ............ C03B 23/0352 65/102 |
| 6,365,284 B1 | | 4/2002 | Liposcak et al. |
| 6,432,545 B1 | | 8/2002 | Schicht et al. |
| 6,572,990 B1 | | 6/2003 | Oyama et al. |
| 6,668,589 B1 | | 12/2003 | Mizusugi et al. |
| 6,749,926 B1 | | 6/2004 | Yoshizawa |
| 7,231,787 B2 | | 6/2007 | Neuman et al. |
| 7,302,813 B2 | | 12/2007 | Balduin et al. |
| 7,648,768 B2 | | 1/2010 | Thiel et al. |
| 7,655,313 B2 | | 2/2010 | Blacker et al. |
| 8,146,387 B2 | | 4/2012 | Ollfisch et al. |
| 8,327,667 B2 | | 12/2012 | Balduin et al. |
| 8,415,013 B2 | * | 4/2013 | Barefoot ............ C03C 3/091 428/410 |
| 8,746,011 B2 | | 6/2014 | Balduin et al. |
| 8,978,418 B2 | * | 3/2015 | Balduin ............ C03B 23/03 65/107 |
| 9,096,456 B2 | * | 8/2015 | Thellier ............ C03B 23/0352 |
| 9,452,662 B2 | | 9/2016 | Balduin et al. |
| 9,650,279 B2 | | 5/2017 | Balduin et al. |
| 9,650,291 B2 | | 5/2017 | Manz et al. |
| 9,656,537 B2 | * | 5/2017 | Dunkmann ............ C03B 23/03 |
| 10,577,271 B2 | * | 3/2020 | Le Ny ............ C03B 23/0355 |
| 2002/0117250 A1 | | 8/2002 | Veerasamy |
| 2002/0189295 A1 | | 12/2002 | Bennett et al. |
| 2002/0192473 A1 | | 12/2002 | Gentilhomme et al. |
| 2003/0182969 A1 | | 10/2003 | Dunifon |
| 2004/0107729 A1 | | 6/2004 | Fukami et al. |
| 2004/0129028 A1 | | 7/2004 | Balduin et al. |
| 2004/0219368 A1 | | 11/2004 | Coster et al. |
| 2005/0002081 A1 | | 1/2005 | Beteille et al. |
| 2005/0123772 A1 | | 6/2005 | Coustet et al. |
| 2005/0142332 A1 | | 6/2005 | Sauer |
| 2006/0182980 A1 | | 8/2006 | Barton et al. |
| 2007/0026238 A1 | | 2/2007 | Chiappetta et al. |
| 2007/0039354 A1 | | 2/2007 | Ollfisch et al. |
| 2007/0157671 A1 | | 7/2007 | Thellier et al. |
| 2008/0070045 A1 | | 3/2008 | Barton et al. |
| 2008/0117371 A1 | | 5/2008 | Shin et al. |
| 2008/0134721 A1 | | 6/2008 | Maeda |
| 2008/0134722 A1 | | 6/2008 | Balduin et al. |
| 2008/0190143 A1 | | 8/2008 | Balduin et al. |
| 2009/0000334 A1 | | 1/2009 | Boisselle et al. |
| 2009/0047509 A1 | | 2/2009 | Gagliardi et al. |
| 2009/0117371 A1 | | 5/2009 | Glaeser et al. |
| 2009/0186213 A1 | | 7/2009 | Ihlo et al. |
| 2009/0277440 A1 | | 11/2009 | Angel et al. |
| 2009/0320824 A1 | | 12/2009 | Henn et al. |
| 2010/0236290 A1 | | 9/2010 | Fukami et al. |
| 2010/0257900 A1 | | 10/2010 | Yajima et al. |
| 2010/0314900 A1 | | 12/2010 | Labrot et al. |
| 2011/0027554 A1 | | 2/2011 | Gouardes et al. |
| 2011/0146172 A1 | | 6/2011 | Mauvernay et al. |
| 2011/0265515 A1 | | 11/2011 | Hernandez et al. |
| 2012/0045652 A1 | | 2/2012 | Zahn et al. |
| 2012/0055197 A1 | | 3/2012 | Balduin et al. |
| 2012/0070624 A1 | | 3/2012 | Payen et al. |
| 2013/0042650 A1 | | 2/2013 | Thellier et al. |
| 2013/0128912 A1 | * | 5/2013 | Molins ............ C30B 11/002 373/27 |
| 2013/0129945 A1 | | 5/2013 | Durandeau et al. |
| 2013/0307286 A1 | | 11/2013 | Balduin et al. |
| 2013/0313852 A1 | | 11/2013 | Balduin et al. |
| 2013/0323415 A1 | | 12/2013 | Brackley et al. |
| 2013/0340479 A1 | | 12/2013 | Balduin et al. |
| 2014/0010976 A1 | | 1/2014 | Gerardin et al. |
| 2014/0011000 A1 | | 1/2014 | Dunkmann et al. |
| 2014/0230493 A1 | * | 8/2014 | Balduin ............ C03B 23/0302 65/106 |
| 2015/0146286 A1 | | 5/2015 | Hagen et al. |
| 2016/0002100 A1 | | 1/2016 | Melcher et al. |
| 2016/0340479 A1 | | 11/2016 | Crossley |
| 2017/0210663 A1 | | 7/2017 | Balduin et al. |
| 2017/0217820 A1 | | 8/2017 | Balduin et al. |
| 2018/0111355 A1 | | 4/2018 | Manz et al. |
| 2018/0179099 A1 | | 6/2018 | Le Ny et al. |
| 2018/0186676 A1 | * | 7/2018 | Schall ............ C03B 23/0357 |
| 2018/0194664 A1 | | 7/2018 | Balduin et al. |

FOREIGN PATENT DOCUMENTS

| | | |
|---|---|---|
| CN | 1518524 A | 8/2004 |
| CN | 1531510 A | 9/2004 |
| CN | 2641043 Y | 9/2004 |
| CN | 1651345 A | 8/2005 |
| CN | 1764607 A | 4/2006 |
| CN | 101094817 A | 12/2007 |
| CN | 100564087 C | 12/2009 |
| CN | 101875536 A | 11/2010 |
| CN | 101888927 A | 11/2010 |
| DE | 3615225 A1 | 11/1987 |
| DE | 3930414 A1 | 3/1991 |
| DE | 4232554 C1 | 1/1994 |
| DE | 4337559 C1 | 3/1995 |
| DE | 4334213 A1 | 4/1995 |
| DE | 19604397 C1 | 7/1997 |
| DE | 69219496 T2 | 12/1997 |
| DE | 69423700 T2 | 10/2000 |
| DE | 10105200 A1 | 8/2002 |
| DE | 10314266 B3 | 6/2004 |
| DE | 102005001513 B3 | 6/2006 |
| DE | 102007059323 A1 | 6/2009 |
| EA | 027316 B1 | 7/2017 |
| EP | 0262046 A2 | 3/1988 |
| EP | 0434656 A2 | 6/1991 |
| EP | 0515847 A2 | 12/1992 |
| EP | 0531152 A2 | 3/1993 |
| EP | 0536607 A2 | 4/1993 |
| EP | 0576179 A1 | 12/1993 |
| EP | 0613865 A1 | 9/1994 |
| EP | 0677491 A2 | 10/1995 |

(56) References Cited

FOREIGN PATENT DOCUMENTS

| | | |
|---|---|---|
| EP | 0706978 A2 | 4/1996 |
| EP | 1047644 B1 | 1/2003 |
| EP | 1281613 A2 | 2/2003 |
| EP | 1358131 A2 | 11/2003 |
| EP | 1371616 A1 | 12/2003 |
| EP | 0877006 B1 | 1/2006 |
| EP | 1611064 B1 | 4/2008 |
| EP | 1218307 B1 | 7/2008 |
| EP | 1917222 B1 | 3/2009 |
| EP | 2141135 A1 | 1/2010 |
| EP | 2233444 A1 | 9/2010 |
| EP | 2247549 A2 | 11/2010 |
| EP | 1836136 B1 | 5/2011 |
| EP | 2463247 A1 | 6/2012 |
| EP | 2463248 A1 | 6/2012 |
| EP | 2639032 A1 | 9/2013 |
| EP | 2639032 B1 | 9/2014 |
| EP | 2016/076072 | 10/2016 |
| FR | 2097019 A1 | 3/1972 |
| GB | 813069 A | 5/1959 |
| JP | S46021038 B1 | 6/1971 |
| JP | S49110710 A | 10/1974 |
| JP | S5130085 B1 | 8/1976 |
| JP | S5243855 B1 | 2/1977 |
| JP | S63027443 U | 2/1988 |
| JP | S63156027 A | 6/1988 |
| JP | H03504003 A | 9/1991 |
| JP | H05147959 A | 6/1993 |
| JP | H05195201 A | 8/1993 |
| JP | H0640732 A | 2/1994 |
| JP | H6256030 A | 9/1994 |
| JP | H08183626 A | 7/1996 |
| JP | 2002527349 A | 8/2002 |
| JP | 2006256902 A | 9/2006 |
| JP | 2006521271 A | 9/2006 |
| JP | 2006528932 A | 12/2006 |
| JP | 2008526659 A | 7/2008 |
| JP | 2010013345 A | 1/2010 |
| JP | 2013529170 A | 7/2013 |
| JP | 2014500222 A | 1/2014 |
| JP | 2014504229 A | 2/2014 |
| KR | 20040037078 A | 5/2004 |
| KR | 20070088745 A | 8/2007 |
| KR | 101343631 B1 | 12/2013 |
| KR | 20140019312 A | 2/2014 |
| RU | 2009107 C1 | 3/1994 |
| RU | 2036861 C1 | 6/1995 |
| RU | 2098362 C1 | 12/1997 |
| RU | 2444478 C1 | 3/2012 |
| RU | 2550611 C1 | 5/2015 |
| WO | 00/29347 A1 | 5/2000 |
| WO | 02/064519 A1 | 8/2002 |
| WO | 03/024649 A1 | 3/2003 |
| WO | 2004/087590 A2 | 10/2004 |
| WO | 2006/043026 A1 | 4/2006 |
| WO | 2006/072721 A1 | 7/2006 |
| WO | 2007/042688 A1 | 4/2007 |
| WO | 2010/074548 A1 | 7/2010 |
| WO | 2010/136702 A1 | 12/2010 |
| WO | 2011/088330 A2 | 7/2011 |
| WO | 2011/105991 A1 | 9/2011 |
| WO | 2012/022876 A2 | 2/2012 |
| WO | 2012/080071 A1 | 6/2012 |
| WO | 2012/080072 A1 | 6/2012 |
| WO | 2012/118612 A1 | 9/2012 |
| WO | 2012/131243 A1 | 10/2012 |
| WO | 2013/131667 A1 | 9/2013 |
| WO | 2016/066309 A1 | 5/2016 |
| WO | 2016/066310 A1 | 5/2016 |
| WO | 2017/029252 A1 | 2/2017 |
| WO | 2017/042037 A1 | 3/2017 |
| WO | 2017/089070 A1 | 6/2017 |
| WO | 2017/129307 A1 | 8/2017 |

OTHER PUBLICATIONS

International Search Report for International Application No. PCT/EP2016/076072 filed Oct. 28, 2016 on behalf of Saint-Gobain Glass France. dated Jan. 13, 2017. 5 pages. (German + English Translation).

International Preliminary Report on Patentability for International Application No. PCT/EP2016/070140 filed Aug. 26, 2016 on behalf of Saint-Gobarin Glass France. dated Mar. 13, 2018. 5 pages.

International Preliminary Report on Patentability for International Application No. PCT/EP2016/080918 filed Dec. 14, 2016 on behalf of Saint-Gobain Glass France, dated Jul. 31, 2017. 6 pages (English Translation + German Original).

International Search Report for International Application No. PCT/EP2015/070430 filed on Sep. 8, 2015 in the name of Saint-Gobain Glass France. dated Nov. 24, 2015. 8 pages, (English translation + German original).

International Search Report for International Application No. PCT/EP2015/070432 filed on Sep. 8, 2015 on behalf of Saint-Gobain Glass France. dated Dec. 7, 2015. 7 pages. (English translation + German original).

International Search Report for International Application No. PCT/EP2016/069317 filed on Aug. 15, 2016 on behalf of Saint-Gobain Glass France, dated Oct. 19, 2016. 5 Pages. (German Original + English Translation).

International Search Report for International Application No. PCT/EP2016/070140 filed Aug. 26, 2016 on behalf of Saint-Gobain Glass France. dated Oct. 19, 2016. 9 pages. (German Original + English translation).

International Search Report for International Application No, PCT/EP2016/080918 filed on Dec. 14, 2016 in the name of Saint-Gobain Glass France. dated Feb. 13, 2017. 7 pages (German Original + English translation).

Non-Final Office Action for U.S. Appl. No. 15/328,471, filed Jan. 23, 2017, on behalf of Saint-Gobain Glass France. dated Dec. 11, 2018. 14 pages.

Non-Final Office Action for U.S. Appl. No. 15/328,475, filed Jan. 23, 2017 on behalf of Saint-Gobain Glass France. dated Mar. 18, 2019. 16 pages.

Non-Final Office Action for U.S. Appl. No. 15/576,699, filed Nov. 30, 2017 on behalf of Saint-Gobain Glass France dated Jun. 7, 2019 32 pages.

Restriction Requirement for U.S. Appl. No. 15/328,471, filed Jan. 23, 2017, on behalf of Saint-Gobain Glass France. dated Aug. 30, 2018. 7 pgs.

Restriction Requirement for U.S. Appl. No. 15/578,699, filed Nov. 30, 2017 on behalf of Saint-Gobain Glass France. dated Apr. 9 , 2019. 7 pages.

International Preliminary Report on Patentability for International Application No. PCT/EP2015/070432 filed on Sep. 8, 2015 in the name of Saint-Gobain Glass France. dated May 2, 2017. 8 pages.

International Preliminary Report on Patentability for International Application No. PCT/EP2016/069317 filed Aug. 15, 2016 on behalf of Saint-Gobain Glass France, dated Feb. 20, 2018. 5 pages.

International Preliminary Report on Patentability for International Application No. PCT/EP2016/076072 filed Oct. 28, 2016 on behalf of Saint-Gobain Glass France, dated May 29, 2018. 7 pages. (German Original + English Translation).

International Preliminary Report on Patentability for International Application No. PCT/EP2015/070430 filed Sep. 8, 2015 on behalf of Saint-Gobain Glass France. dated May 2, 2017. 7 pages.

Written Opinion for International Application No. PCT/EP2016/070140 filed Aug. 26, 2016 on behalf of Saint-Gobain Glass France, dated Oct. 19, 2016. 9 pages. (German Original + English translation).

Written Opinion for International Application No. PCT/EP2015/070430 filed Sep. 8, 2015 on behalf of Saint-Gobain Glass France. dated Nov. 24, 2015. 12 pages. (English Translation + German Original).

(56) References Cited

OTHER PUBLICATIONS

Written Opinion for International Application No. PCT/EP2015/070432 filed Sep. 6, 2015 on behalf of Saint-Gobain Glass France. dated Dec. 7, 2015. 14 pages. (English Translation + German Original).

Written Opinion for International Application No. PCT/EP2016/080918 filed Dec. 14, 2016 on behalf of Saint-Gobain Glass France. dated Feb. 13, 2017. 9 pages (English Translation + German Original).

Written Opinion for International Patent Application No. PCT/EP2016/069317 filed on Aug. 15, 2016 on behalf of Saint-Gobain Glass France. dated Oct. 19, 2016. 9 pages. (German Original + English Translation).

Final Office Action for U.S. Appl. No. 15/328,471, filed Jan. 23, 2017 on behalf of Saint Gobain Glass France dated May 15, 2019 9 pages.

Final Office Action for U.S. Appl. No. 15/328,475, filed Jan. 23, 2017 on behalf of Saint Gobain Glass France dated Aug. 27, 2019 17 pages.

Final Office Action for U.S. Appl. No. 15/578,699, filed Nov. 30, 2017 on behalf of Saint-Gobain Glass France dated Sep. 3, 2019 20 pages.

Indian First Examination Report for IN Application No. 201837004251 filed on Feb. 5, 2018 on behalf of Saint Gobain Glass France dated Jun. 28, 2019 5 pages.

Restriction Requirement for U.S. Appl. No. 15/741,256, filed Dec. 30, 2017 on behalf of Saint-Gobain Glass France dated Sep. 17, 2019 8 pages.

Restriction Requirement for U.S. Appl. No. 15/741,264, filed Dec. 31, 2017 on behalf of Saint-Gobain Glass France dated Sep. 17, 2019 7 pages.

Russian Office Action for RU Application No. 2018115725/03 filed on Dec. 14, 2016 on behalf of Saint Gobain Glass France dated Apr. 24, 2019 5 pages (English Translation Only).

Office Action as issued in Chinese Patent Application No. 201680002914.9, dated Mar. 11, 2020.

* cited by examiner

```
┌─────────────────────────────────────────────────────────────────────┐
│ Placing a glass pane I on the supporting surface 2 of a gravity     │
│ bending mould 1 as part of a multipart bending tool, which includes,│
│ besides the gravity bending mould 1, a second frame-like lower      │
│ mould 13 surrounding it, whose supporting surface is arranged, in   │
│ the initial state, below the supporting surface 2                   │
└─────────────────────────────────────────────────────────────────────┘
                                  ↓
┌─────────────────────────────────────────────────────────────────────┐
│              Heating the glass pane I to bending temperature         │
└─────────────────────────────────────────────────────────────────────┘
                                  ↓
┌─────────────────────────────────────────────────────────────────────┐
│ Lowering an upper shaping tool 3 according to the invention onto    │
│ the surface O of the glass pane I facing away from the gravity      │
│ bending mould 1                                                      │
└─────────────────────────────────────────────────────────────────────┘
                                  ↓
┌─────────────────────────────────────────────────────────────────────┐
│ Streaming air into the subspaces 5.1, 5.2, 5.3 of the shaping tool 3│
│ for producing an overpressure on the surface O, with the corners of │
│ the glass pane I being subjected to greater overpressure than the   │
│ central region of the glass pane I                                   │
└─────────────────────────────────────────────────────────────────────┘
                                  ↓
┌─────────────────────────────────────────────────────────────────────┐
│           Waiting until the desired shape of the glass pane I is    │
│                              achieved                                │
└─────────────────────────────────────────────────────────────────────┘
                                  ↓
┌─────────────────────────────────────────────────────────────────────┐
│                        Raising the shaping tool 3                    │
└─────────────────────────────────────────────────────────────────────┘
                                  ↓
┌─────────────────────────────────────────────────────────────────────┐
│ Vertical movement of the gravity bending mould 1 downward such that │
│ the glass pane I is transferred from the gravity bending mould 1    │
│ onto the supporting surface of the second lower mould 13            │
└─────────────────────────────────────────────────────────────────────┘
                                  ↓
┌─────────────────────────────────────────────────────────────────────┐
│                        Heating the glass pane I                      │
└─────────────────────────────────────────────────────────────────────┘
                                  ↓
┌─────────────────────────────────────────────────────────────────────┐
│        Gravity bending of the glass pane I on the second lower      │
│                              mould 13                                │
└─────────────────────────────────────────────────────────────────────┘
                                  ↓
┌─────────────────────────────────────────────────────────────────────┐
│                        Cooling the glass pane (I)                    │
└─────────────────────────────────────────────────────────────────────┘
```

Fig. 5

OVERPRESSURE-ASSISTED GRAVITY BENDING METHOD AND DEVICE SUITABLE THEREFOR

CROSS REFERENCE TO RELATED APPLICATIONS

The present application is the U.S. national stage entry of International Patent Application No. PCT/EP2016/076072, filed internationally on Oct. 28, 2016, which, in turn, claims priority to European Patent Application No. 15196183.6, filed on Nov. 25, 2015.

The invention relates to an overpressure-assisted gravity bending method for glass panes, a device suitable therefor, as well as the use of an upper shaping tool for producing an overpressure in a gravity bending method.

Glazings for motor vehicles typically have a bend. A common method for bending glass panes is the so-called gravity bending method (also known as sag bending). Therein, the glass pane, flat in the initial state, is arranged on the supporting surface of a bending mould. The pane is then heated to at least its softening temperature such that it rests, under the influence of gravity, on the supporting surface. By means of the design of the supporting surface, the shape of the glass pane can thus be influenced. The final bend can be achieved by gravity bending. Such a method is known, for example, from GB 813069 A. However, in the case of more complex pane shapes, multistage bending methods are frequently used. Typically, a preliminary bend is produced in a first bending step by means of gravity bending, whereas the final shape is produced in a second bending step—frequently using press bending between two complementary bending moulds. Such multistage bending methods are known, for example, from EP 1 836 136 B1, US 2004107729 A1, EP 0531152 A2, and EP 1371616 A1.

The disadvantages of conventional gravity bending methods include high bending temperatures to effectively soften the glass panes and long bending times until the panes have taken their desired shape. Both result in increased production costs. Moreover, in more complex multistage bending methods in which the glass pane, after gravity bending, is transferred from the gravity bending mould to a different, more sharply curved lower bending mould, bending errors can occur: immediately after the transfer, the glass pane rests on the new bending mould at only three or four points, before it has assumed the new shape, as result of which, due to the high load on these points, undesirable bending in the opposite direction can occur (so-called counter-bending or cross-bending).

EP 0 706 978 A2 discloses a gravity bending method that is assisted by overpressure. The pane to be bent is arranged between the lower gravity bending mould and an upper shaping tool. An overpressure on the upper glass surface is produced by the upper shaping tool, by means of which the shaping of the pane in the gravity bending mould is accelerated. The upper shaping tool can have a full-surface or a frame-like peripheral contact surface. The shaping tool can be brought directly into contact with the glass pane ("hard seal") or positioned slightly above the glass pane ("soft seal").

The aforementioned EP 0 706 978 A2 also discloses the possibility of producing an inhomogeneous pressure distribution on the glass pane, wherein regions of the pane are subjected to a higher overpressure and other regions of the pane are subjected to a lower overpressure. For this, the shaping tool is divided into different, physically separated subspaces, which have in each case their own gas feed line. Due to the large number of independent gas feed lines, such a tool is expensive to manufacture and maintain.

Other overpressure-assisted bending methods are, for example, known from WO 2012/118612 A1 and US 2007/157671 A1.

WO 2014/166793 A1 discloses a steel-containing fabric for lining glass bending tools.

The object of the present invention is to provide a further improved gravity bending method and a device suitable therefor. In particular, an inhomogeneous pressure distribution for supporting the gravity bending should be produced with means that are simpler to manufacture and maintain than the known solutions.

The object of the invention is accomplished according to the invention by a device for bending at least one glass pane, at least comprising a gravity bending mould with a supporting surface that is suitable for arranging at least one glass pane thereon,
an upper shaping tool arranged opposite the supporting surface, which upper shaping tool is suitable for producing an overpressure on the surface of the at least one glass pane arranged on the supporting surface facing away from the supporting surface, wherein the shaping tool has a cover that forms a hollow space open in the direction of the gravity bending mould and is equipped with means to introduce a gas into the hollow space to produce the overpressure.

The hollow space is divided by at least one separating wall into at least two subspaces such that a different pressure can be produced in at least two regions of the surface of the glass pane. The shaping tool is equipped with a common gas feed line all the way to which the separating wall extends.

The object of the invention is, moreover, accomplished by a method for bending at least one glass pane, at least comprising the following process steps:

(a) Arranging at least one glass pane on a supporting surface of a gravity bending mould,
(b) Heating the glass pane to at least its softening temperature,
(c) Producing an overpressure on the surface of the at least one glass pane facing away from the supporting surface using an upper shaping tool that has a cover that forms a hollow space open in the direction of the gravity bending mould, wherein the overpressure is produced by introducing a gas into the hollow space, wherein the hollow space is divided by at least one separating wall into at least two subspaces, which wall extends to a common gas feed line of the shaping tool such that a different pressure is produced in at least two regions of the surface, and
(a) Cooling the glass pane (I).

The device and the method are presented together in the following, with explanations and preferred embodiments referring equally to the device and the method.

The bending method to be performed with the device according to the invention can be referred to as overpressure-assisted gravity bending. As in the case of a prior art gravity bending method, gravity acts on the softened glass pane, which rests as a result on the bending mould. This procedure is, however, assisted in that the glass pane is subjected to an overpressure. By means of the overpressure, the softened glass pane is, so to speak, pressed into the bending mould, by means of which the gravitational effect is assisted. Thus, for one thing, the deformation is accelerated such that the desired shape of the glass pane is achieved more rapidly. For another, adequate deformation can be achieved, even at lower temperatures. Thus, production costs can be reduced and cycle times shortened.

The invention enables producing an inhomogeneous pressure distribution on the glass surface. Thus, a sharper bend can be produced in selected regions of the glass pane than in other regions. This increases the flexibility of the bending method and more complex pane shapes can be achieved. These are major advantages of the present invention.

The device according to the invention for bending at least one glass pane comprises at least a lower gravity bending mould and an upper shaping tool. The glass pane to be bent is placed on the gravity bending mould and arranged between the gravity bending mould and the upper shaping tool.

The invention also includes an arrangement for bending at least one glass pane, comprising the device according to the invention and a glass pane arranged on the supporting surface of the gravity bending mould.

The overpressure on the glass surface is produced by a gas stream that is routed onto the glass surface by the upper shaping tool. The gas enters the hollow space of the shaping tool via a gas feed line (or inflow pipe). The gas again leaves the hollow space through the opening of the hollow space facing the gravity bending mould and is routed onto the glass surface. The separating wall runs from the gas feed line through the hollow space into the region of the opening and divides the hollow space into at least two subspaces. In other words, the separating wall divides the gas stream through hollow space into two or more substreams. The separating wall can extend into the gas feed line or also end immediately before it or a short distance before it. By means of suitable dimensioning of the respective inlet and outlet cross-sections, the respective strengths of the substreams is adjusted differently such that different regions of the glass surface are subjected to a different gas stream.

Due to the fact that the at least one separating wall extends to the gas feed line, it divides the cross-section of this gas feed line into at least two sub-cross-sections: a first feed line sub-cross-section and a second feed line sub-cross-section. The gas flowing out of the gas feed line into the first sub-cross-section is routed into the first subspace of the hollow space of the shaping tool; gas in the second sub-cross-section, into the second subspace.

The gas outlet cross-section of the hollow space is defined by the opening in the direction of the gravity bending mould and usually corresponds to this opening. The at least one separating wall also divides this gas outlet cross-section into at least two sub-cross-sections: a first outlet sub-cross-section and a second outlet sub-cross-section. Gas from the first subspace is routed through the first outlet sub-cross-section; and gas from the second subspace, through the second outlet sub-cross-section. The ratio of the first feed line sub-cross-section to the second feed line sub-cross-section is different from the ratio of the first outlet sub-cross-section to the second outlet sub-cross-section. Thus, a disproportionately large amount of gas, measured at the outlet cross-section, is routed into one of the subspaces, by which means a stronger gas stream is produced in this subspace, which, in turn, produces greater overpressure in the associated region of the glass surface.

In the context of the invention, the term "overpressure" means a pressure that is greater than the ambient pressure. The shaping tool can have a plurality of subspaces due to a plurality of separating walls. Different subspaces can produce the same overpressure so long as at least one of the subspaces produces an overpressure different therefrom. A different overpressure manifests itself, in particular, in a gas stream of a different strength.

In an advantageous embodiment, the at least one separating wall is arranged such that, in the region of at least one corner of the glass pane, a higher pressure is produced than in the central region of the glass pane. Thus, complex pane shapes, which typically have strong bends precisely in the region of the corners, can be realised. Moreover, the phenomenon of counter bending can be counteracted: If the glass pane is transferred, after gravity bending, to another lower bending mould, it initially rests on only a few points, typically in the region of the corners, on the supporting surface of the new mould, before it has taken its shape in another bending step. The strong stress at the contact points can result in undesirable bending, typically counter to the intended bending direction. By means of the stronger overpressure during gravity bending in the region of the corners, they can be provided with excessive bending, which is compensated by the undesirable counter bending per se, yielding the actually desired bend. Preferably, the regions of two adjacent corners are subjected to the higher pressure, for example, both corners of the upper edge or both corners of the lower edge. The terms "upper edge" and "lower edge" refer to the intended installed position of the glass pane. The regions of all four corners can also be subjected to the higher pressure.

In a first region of the glass surface, a higher pressure is produced than in a second region. In an advantageous embodiment of the method, a pressure of 0 mbar to 15 mbar, preferably from 2 mbar to 10 mbar, is produced in a first region; and in the second region of the glass surface, a pressure from 15 mbar to 30 mbar, preferably from 20 mbar to 25 mbar. Thus, good results are obtained.

In a particularly advantageous embodiment, said first region includes the pane centre and said second region includes at least one pane corner. Preferably, there are at least two second regions, of which each includes one of two adjacent corners, for example, the corners of the upper edge or the lower edge or all corners. It is also possible for two adjacent corners to be allocated to the second region and the two remaining adjacent corners, allocated to a third region, which produces a third pressure.

The gravity bending mould has a supporting surface that is suitable for arranging at least one glass pane thereon. The supporting surface defines the shape of the bent glass pane. When the glass pane is heated to at least its softening point, it rests under the influence of gravity on the supporting surface, by which means the desired shape is achieved. A gravity bending mould is a so-called "lower mould" onto which the pane can be placed such that the supporting surface makes contact with the lower surface of the glass pane that faces the ground. Customarily, the edge region of the glass pane protrudes circumferentially beyond the supporting surface.

The present invention is not restricted to a specific type of gravity bending mould. The supporting surface is preferably implemented concave. The term "a concave mould" is understood to mean a mould in which the corners and edges of the glass pane in the intended contact with the supporting surface are bent in the direction away from the bending mould.

The supporting surface can, for example, be implemented full surface and be brought full surface into contact with the glass pane. However, in a preferred embodiment, the gravity bending mould has a frame-like supporting surface. Only the frame-like supporting surface is in direct contact with the glass pane, whereas most of the pane has no direct contact with the tool. Thus, panes with particularly high optical quality can be produced. Such a tool can also be referred to as a ring (bending ring) or frame (frame mould). In the context of the invention, the term "frame-like supporting surface" serves only to distinguish the tool according to the invention from a full-surface mould. The supporting surface need not form a complete frame, but can also be discontinuous. The supporting surface is implemented in the form of a complete or discontinuous frame.

The width of the frame-like supporting surface is preferably from 0.1 cm to 20 cm, particularly preferably from 0.1 cm to 5 cm, for example, 0.3 cm.

The surface of the glass pane facing away from the gravity bending mould is subjected, according to the invention, to the overpressure. The surface of the glass pane facing away from the gravity bending mould can also be referred to as the "upper surface"; and the surface facing the gravity bending mould, as the "lower surface".

In an advantageous embodiment, the gravity bending mould can be moved vertically relative to a second lower mould in order to transfer the glass pane between the gravity bending mould and the second lower mould. The gravity bending mould and the second lower mould are, in particular, part of a multipart bending tool. Preferably, the second lower mould is also frame-like and concave. The gravity bending mould can be arranged within the second lower mould. In other words, the supporting surface of the second lower mould circumscribes a larger circumference than the supporting surface of the gravity bending mould and has a greater distance from the centre of the multipart bending tool—the second lower mould thus surrounds the gravity bending mould. However, alternatively, the second lower mould can also be arranged inside the gravity bending mould. The gravity mould is movable vertically relative to the second lower mould in order to transfer the glass pane between the gravity bending mould and the second lower mould. During the gravity bending process, the gravity bending mould is arranged above the second lower mould and the pane rests on the supporting surface of the gravity bending mould. Then, the gravity bending mould is moved vertically downward relative to the second lower mould. Significant here is the movement of the two moulds relative to one another, with the actual physical movement being done by the gravity bending mould (downward), by the second lower mould (upward), or by both. As soon the supporting surface of the gravity bending mould is arranged below the supporting surface of the second lower mould, the glass pane rests on the supporting surface of the second lower mould and the supporting surface of the gravity bending mould is free. Thus, the glass pane is transferred by the gravity bending mould onto the second lower mould. In an advantageous embodiment, the second lower mould is also a gravity bending mould, but with a stronger curvature than the first gravity bending mould.

Reasonably, the supporting surface of the second lower mould has different geometry, in particular curvature, from the supporting surface of the gravity bending mould. The second lower mould is provided for another bending step in which a more complex, typically, a more sharply curved pane shape is achieved. Since, at the time of the transfer, the glass pane has the bend defined by the gravity bending mould, it rests, after the transfer, on the second lower mould at only a few points, typically in the region of the corners of the pane. Not until during the following bending step does the pane assume the bend defined by the supporting surface of the second lower mould, and then rests on the entire supporting surface. The strong stress at the support points after the transfer can result in undesirable bends. Typically, the upper side of the glass pane is the concave side. The point-wise pressure from below results in bending against this main bending direction and can produce, locally, a convex bending of the upper side or at least counteract the desired pre-bending. In this context, this is referred to as counter bending or cross bending. This effect can be compensated by the upper shaping tool according to the invention in that the regions affected by counter bending, typically the corner regions, are subjected to a stronger overpressure during gravity bending and are, consequently, more greatly curved. It is thus possible to locally produce a bend that is greater than the actually desired pre-bend, which is again compensated by counter bending after the transfer.

During the bending procedure, the upper shaping tool is arranged opposite the supporting surface of the gravity bending mould such that a glass pane can be arranged between the gravity bending mould and the shaping tool. For this, it is suitable to produce an overpressure on the surface, facing away from supporting surface, of the glass pane arranged on the supporting surface. The shaping tool is not implemented as a mould with a full-surface contact surface, but rather as a hollow mould. The shaping tool has a cover, made, for example, from a metal sheet. The cover is shaped such that it forms a hollow space. The hollow space is not a closed hollow space, but rather has a large opening that faces the gravity bending mould. The tool can be referred to as bell-like or hood-like.

The device according to the invention also includes means to move the gravity bending mould and the shaping tool relative to one another. By this means, the gravity bending mould and the shaping tool are brought near one another after the glass pane has been placed on the gravity bending mould such that the shaping tool is brought into contact with the glass pane. They can be brought near each other by moving the gravity bending mould, the shaping tool, or both. In a preferred embodiment, the shaping tool is moved and lowered onto the glass pane, whereas the gravity bending mould executes no vertical movement.

The device according to the invention also includes means for heating the glass pane to softening temperature. Typically, the gravity bending mould and the upper shaping tool are arranged within a heatable bending furnace or a heatable bending chamber. For heating, the glass pane can pass through a separate chamber, for example, a tunnel furnace.

The overpressure is produced by introducing a gas into the hollow space of the shaping tool. For this, the shaping tool is equipped with means for introducing a gas into the hollow space to produce the overpressure. For this, a pipe (inflow pipe) that leads from the outside environment into the hollow space is preferably set in the cover as a gas feed line. The gas is introduced into the hollow space via the pipe. In a preferred embodiment, the gas is, in particular, compressed air, since this can be produced economically. However, in principle, other gases can also be used, for example, carbon dioxide or nitrogen. The air can be conveyed through the pipe into the hollow space in any manner, for example, by Venturi nozzles or a blower.

The inflowing gas is preferably heated so as to not cool the glass pane during the bending process, which typically takes place at elevated temperatures. The temperature of the gas preferably corresponds approximately to the temperature of the glass pane.

In the hollow space, a deflector plate can be arranged opposite the pipe outlet, in particular in the subspace of the hollow space positioned directly under the pipe outlet such that the gas stream would strike directly on the glass surface. Instead, the inflowing gas then strikes the deflector plate. This prevents the inflowing gas from striking the gas plate directly and it is possible to produce a homogeneous overpressure in the entire subspace, or on the entire surface region of the gas pane associated therewith.

The cover preferably has a material thickness of at most 5 mm, particularly preferably from 2 m to 4 mm. By means of these low material thicknesses, the weight of the shaping tool can be kept low. The cover is preferably made of steel or stainless steel.

The shaping tool can be brought directly into contact with the upper surface of the pane or positioned without direct contact at a suitably low distance above the glass pane.

In an advantageous embodiment, the shaping tool is brought into contact with the glass pane by means of a sealing lip. By means of the sealing lip, a positive connection between the shaping tool and the glass pane can be made, by means of which a higher overpressure can be produced. Thus, greater efficiency of the glass bending process is achieved. By means of the sealing lip, the risk of damage to the glass is also reduced compared to direct contact of the metal shaping tool with the glass pane.

The shaping tool is equipped, in this advantageous embodiment, with at least one sealing lip. The sealing lip serves for contacting with the upper surface of the glass pane to be bent. The sealing lip is arranged on a circumferential edge section of the cover, in particular on the surface of the edge section facing the hollow space. The hollow space of the shaping tool, which is, according to the invention, open toward the gravity bending tool and toward the glass pane, is, so to speak, sealed by the glass pane via the sealing lip such that an overpressure can be effectively produced in the hollow space and on the upper surface of the glass pane. The term "edge section" refers to a region of the cover associated with the edge, with the sealing lip typically being at a distance from the side edge of the cover.

The sealing lip makes contact with the glass pane circumferentially in its edge region such that the overpressure according to the invention can be produced on most of the upper surface. The contact region between the sealing lip and the surface of the glass pane is preferably at a distance of at most 20 cm from the side edge of the glass pane, particularly preferably at most 10 cm. The overpressure is preferably produced on at least 80% of the surface, with the regions of the surface not subjected to overpressure arranged in its edge region, outside the region surrounded by the sealing lip.

The sealing lip is preferably made of felt or fleece. Particularly preferably, a belt is arranged in the felt or fleece to weight the sealing lip. Thus, the sealing lip can be reliably held in contact with the glass surface. A felt or fleece strip can, for example, be wrapped around the belt. The felt or the fleece is preferably metal-containing, particularly preferably stainless-steel-containing. The felt or the fleece is preferably a metal-containing felt or metal fleece, particularly preferably a stainless-steel-containing felt or stainless steel fleece. These materials have, on the one hand, adequate stability for industrial mass production and are, on the other hand, adequately soft to not damage the glass surface. The material thickness of the felt or fleece is preferably from 0.1 mm to 10 mm, particularly preferably from 1 mm to 5 mm.

The belt (weighted belt) preferably contains glass fibres and/or metal fibres, particularly preferably a glass fibre—metal fibre mixture. The thickness of the belt is preferably from 1 mm to 100 mm, particularly preferably from 5 mm to 30 mm.

In an advantageous embodiment, the edge section of the cover, on which the sealing lip is optionally arranged, is, in a purposeful arrangement of the shaping tool, directed downward. The edge section is preferably arranged substantially vertically. The downward directed edge section is frequently referred to as an "apron". The side edge of the cover can be arranged on the end of the downward directed edge section and point downward. However, it does not negatively affect the function if, for example, the end of the edge section is bent such that the side edge does not point downward.

In an advantageous embodiment of the invention, the device is dimensioned and configured such that, during bending, said edge section of the cover, or at least its downward directed part, is arranged completely above the surface of the glass pane to be bent. In this case, the dimension of the gas outlet opening is preferably smaller than the dimension of the glass surface such that the entire gas stream is available for producing the overpressure, which is advantageous in terms of efficiency. If the glass surface is contacted directly (by the cover itself or a sealing lip), the force sealing the hollow space acts directly on the glass surface, which is also advantageous for efficiency.

In another advantageous embodiment of the invention, the device is dimensioned and configured such that, during bending, the edge section surrounds the glass pane to be bent. The edge section (the "apron") thus overlaps, so to speak, the glass pane such that the glass pane—at least in its flat initial state—is arranged completely inside the hollow space of the shaping tool. The advantage resides in the fact that the shaping tool need not be adapted to the size of the glass pane to be bent, but, rather, that various glass panes of different sizes can be processed with the same tool, so long as the glass pane fits into the hollow space.

An advantage of the invention is that by means of the overpressure assistance, the desired pane shape can be achieved faster than with prior art gravity bending. Thus, shorter cycle times can be realised in industrial mass production. In an advantageous embodiment, the overpressure is produced over a period of at most 100 seconds on the upper surface of the glass pane, preferably at most 60 seconds, particularly preferably at most 30 seconds. The period over which the overpressure is produced on the surface can, for example, be from 5 seconds to 30 seconds.

Another advantage of the invention is that the bending can be achieved by overpressure assistance at lower temperatures than with prior art gravity bending. Thus, energy can be saved because the bending chamber need not be heated so much. Soda lime glass, the typical glass for window panes, is usually bent at approx. 630° C. By means of the overpressure assistance according to the invention, bending can be done already at lower temperatures, for example, 610° C. with adequate speed. Consequently, the maximum temperature to which the glass pane is heated is, in an advantageous embodiment, less than 630° C., preferably less than 620° C., when the glass pane contains or is made of soda lime glass.

The glass pane to be bent can, however, also contain other types of glass such as borosilicate glass or quartz glass. The thickness of the glass pane is typically from 0.2 mm to 10 mm, preferably 0.5 mm to 5 mm.

The sequence of the process steps must not be interpreted to mean that measures for producing the overpressure are taken only after the softening temperature has been exceeded. Instead, the glass pane can already be subjected to the overpressure during heating. The overpressure can, of course, only develop its effect after the softening temperature is reached; however, for process technology reasons, it may be simpler to produce the overpressure continuously.

The overpressure-assisted gravity bending can be the only bending step or also part of a multistage bending process in which other bending steps precede or follow. For example, other bending steps can occur between the overpressure-assisted gravity bending and the cooling of the glass pane, for example, using gravity bending, press bending, or suction bending. For this, the glass pane can be transferred from the gravity bending mould according to the invention to other bending moulds.

The cooling of the glass pane can be done on the gravity bending mould according to the invention or even on another mould onto which the pane is transferred. Cooling can be done at ambient temperature or by active cooling.

The gravity bending mould according to the invention can be implemented movable, for example, mounted on a cart. Thus, the glass pane to be bent can be transported on the gravity bending mould under the upper shaping tool. The gravity bending mould can pass through a furnace for heating, with the glass pane being heated to bending temperature or at least preheated. By means of physical separation of the heating and the overpressure-assisted bending into different chambers of a bending furnace, higher cycle rates can be obtained than when the pane is not heated until reaching the bending chamber. Typical bending temperatures are from 500° C. to 700° C., preferably from 550° C. to 650° C.

In a particularly preferred improvement of the method, after the overpressure-assisted gravity bending according to the invention, the glass pane is transferred to another lower mould. This transfer preferably occurs using a multipart bending tool in which the pane is done by relative vertical movement of different bending moulds, as described above. Then, the glass pane is preferably subjected to another bending step. This is preferably another gravity bending step on the second lower mould. Here, the glass pane is preferably heated again in order to reach a higher temperature or to compensate interim cooling. Alternatively, however, the additional bending step can also be a press bending step between the second lower mould and a complementary upper press bending mould.

In a particularly advantageous embodiment of the invention, complex pre-bending of the glass pane is achieved through the two gravity bending steps, while the final pane shape is achieved in a subsequent press bending step. Thus, particularly complex pane geometries can be realised. A particularly suitable method is described in EP 1836136 B1. Here, the glass pane is lifted from the gravity bending mould by an upper mould, by sweeping its edge with a stream of air. Then, the glass pane is arranged between this upper mould and a lower full mould, which is implemented with holes by means of which suction is exerted on the glass pane.

Even multiple, for example, two glass panes lying one atop the other can be bent simultaneously by the device according to the invention and the method according to the invention. This can, in particular, be desirable when two individual panes are to be laminated later to form a composite glazing so their shape is optimally matched to one another. For this, the glass panes are arranged flat one atop the other and simultaneously bent congruently together. A separation means is arranged between the glass panes, for example, a separating powder or a fabric such that the glass panes can again be detached from one another after bending. In an advantageous embodiment, the method is applied to multiple, in particular, to two glass panes lying one atop the other.

The invention also includes the use of an upper shaping tool that has a cover that forms a hollow space open in the direction of the gravity bending mould for assisting a gravity bending process, wherein, with the shaping tool, an overpressure is produced on the surface of a glass pane to be bent facing away from the gravity bending mould, by introducing a gas into the hollow space, wherein the hollow space is divided by at least one separating wall into at least two subspaces, which wall extends to a common gas feed line of the shaping tool such that a different pressure is produced in at least two regions of the surface.

In the following, the invention is explained in detail with reference to drawings and exemplary embodiments. The drawings are schematic representations and not to scale. The drawings in no way limit the invention.

Figure 2:
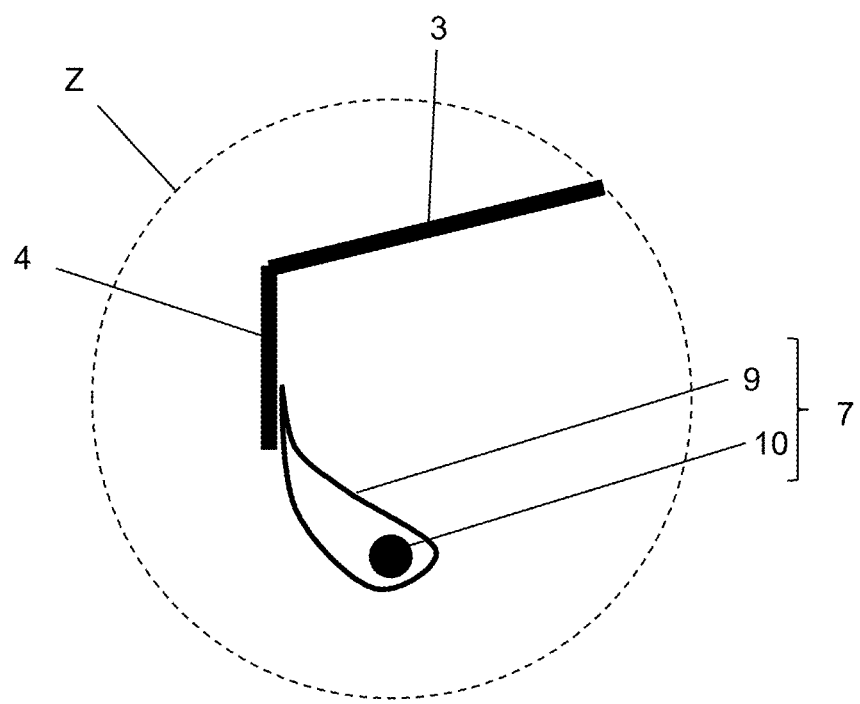
Figure 3:
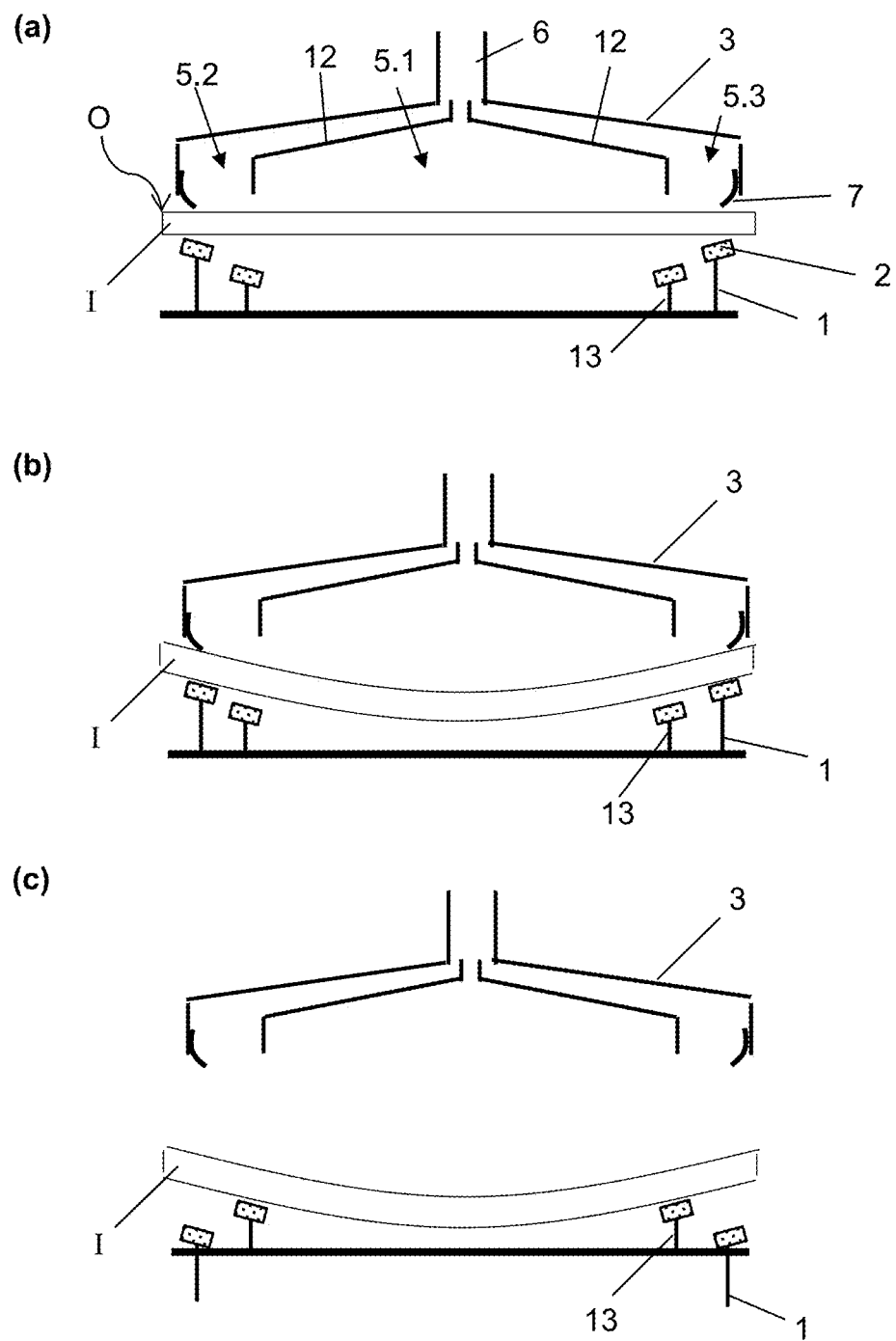
Figure 4:
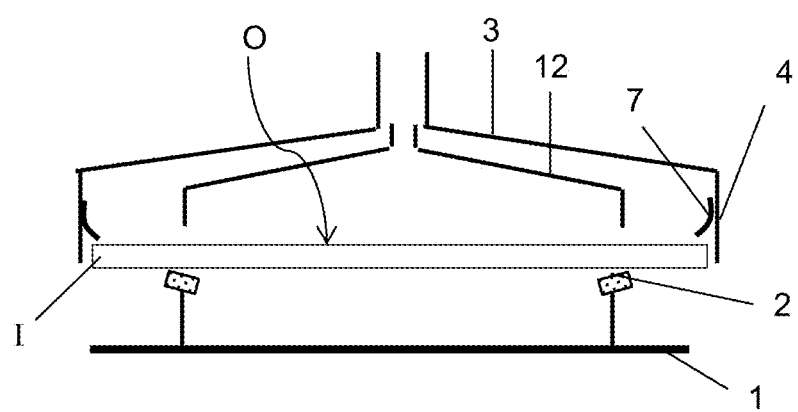

They depict:

FIG. 1 a cross-section through an embodiment of the upper shaping tool according to the invention, FIG. 2 an enlarged representation of the detail Z of FIG. 1, FIG. 3 a cross-section through a device according to the invention during an embodiment of the method according to the invention, FIG. 4 a cross-section through another embodiment of the upper shaping tool according to the invention during the method according to the invention, and FIG. 5 a flowchart of an embodiment of the method according to the invention.

FIG. 1 and FIG. 2 depict in each case a detail of a shaping tool 3 according to the invention. The shaping tool 3 has a cover 8 that is formed from a steel plate only 3 mm thick. Thus, the shaping tool 3 has only a low weight. The cover 8 forms a hollow space 5 that is open in the direction of the glass pane I. An edge section 4 of the cover 8 runs substantially vertically (a so-called "apron").

The cover 8 is equipped centrally with a gas feed line 6 (inflow pipe), via which heated compressed air can flow into the hollow space 5 to produce an overpressure on the surface of a glass pane during the gravity bending process. The shaping tool 3 is equipped with separating walls 12 that divide the hollow space into subspaces. Shown are two separating walls 12 that divide the hollow space into a central subspace 5.1 and two outer subspaces 5.2, 5.3. The cross-section depicted runs in the vicinity of a side edge of the shaping tool; the subspaces 5.2 and 5.3 are arranged in the corners of the shaping tool.

The separating walls 12 extend into the gas feed line 6 and run from there through the hollow space into the region of its outlet opening. The gas stream flowing in through the gas feed line 6 is separated by the separating walls 12 into substreams, which flow in each case into a subspace 5.1, 5.2, 5.3. By means of suitable division of the inlet cross-sections and outlet cross-sections, disproportionately more gas flows into the outer subspaces 5.2, 5.3 such through the subspaces 5.2, 5.3, a higher overpressure is produced on the glass surface than through the central subspace 5.1. The regions of the glass pane associated with these subspaces 5.2, 5.3, namely the corner regions, are consequently more sharply bent than the central region of the glass pane, which is associated with the subspace 5.1. Thus, complex pane geometries are enabled. The cross-section of the gas feed line 6 is divided by the separating walls 12 into sub-cross-sections. Likewise, the cross-section of the opening of the hollow space is divided by the separating walls 12 into sub-cross-sections. The respective ratio of the feed line sub-cross-section of the outer subspaces 5.2, 5.3 to the feed line sub-cross-section of the central subspace 5.1 is greater than the respective ratio of the outlet sub-cross-sections of the outer subspaces 5.2, 5.3 to the outlet sub-cross-section of the central subspace 5.1.

The central subspace 5.1 is arranged directly below the gas feed line 6 such that inflowing gas would strike directly on the glass surface, which could result in undesirable bending effects. To prevent this and to produce homogeneous overpressure in the subspace 5.1, a deflector plate 11, which the inflowing air strikes, is arranged in the subspace 5.1 opposite the opening of the inflow pipe 6.

A sealing lip 7 is attached on the edge section 4, on the side facing the hollow space, of course. The circumferential sealing lip 7 is made of a stainless steel fleece 9 with a material thickness of 3 mm. A strip of the stainless steel fleece 9 is placed around a belt 10, which is thus arranged inside the sealing lip and effects weighting of the sealing lip 7. The belt 10 is made of a glass fibre—metal fibre mixture and has a roughly circular cross-section with a diameter of 20 mm. Such a sealing lip 7 ensures good sealing of the hollow space, is adequately flexible to avoid negative effects on the glass pane I, and adequately stable to be able to be used industrially.

FIG. 3 depicts a device according to the invention during the method according to the invention for bending a glass pane I. The glass pane I, flat in the initial state, is placed on the frame-like, concave supporting surface 2 of a gravity bending mould 1 (FIG. 3a). As customary in gravity bending, the glass pane I is heated to a bending temperature which corresponds at least to the softening temperature. The softened glass pane I then clings to the supporting surface 2 under the effect of gravity (FIG. 3b).

According to the invention, the gravity bending is assisted by the upper shaping tool 3, which produces an overpressure on the upward facing surface O of the glass pane I facing away from the supporting surface 2. The upper shaping tool 3 is a bell-like or hood-like tool that has a hollow space 5 that faces the glass pane I. The upper shaping tool 3 makes contact with the upper surface O of the glass pane I via a circumferential sealing lip 7 such that the glass pane I seals the hollow space 5. The overpressure on the surface O is produced by compressed air flowing into the hollow space 5. The hollow space is divided by separating walls 12 into subspaces 5.1, 5.2, 5.3, as described above with reference to FIG. 1.

By means of the overpressure, the deformation of the glass pane I is assisted under the influence of gravity. Thus, the desired shape can already be achieved at lower bending temperatures and in less time. By means of the division of the hollow space into subspaces 5.1, 5.2, 5.3, an inhomogeneous pressure distribution is produced on the surface O. In the region of the corners of the glass pane I, the overpressure is greater (for example, 20 mbar) than in the central region (for example, 8 mbar). Consequently, the corners can be bent faster and more sharply.

The contacting of the upper shaping tool 3 with the glass pane I is done via the sealing lip 7, resulting in effective sealing of the hollow space such that an advantageously high overpressure can be produced. Due to the fact that the glass pane I makes contact with the flexible sealing lip 7 instead of the rigid, metal cover of the shaping tool 3, damage or a reduction in the optical quality of the glass pane I can be avoided. The vertical edge section 4 of the cover 8 and the sealing lip 7 are arranged completely above the glass pane I. Hence, during bending, the edge section 4 is directed onto the surface O. Since the pressing force produced by the upper shaping tool 3 acts directly on the surface O, efficient sealing of the hollow space is achieved and a high overpressure can be produced.

The gravity bending mould 1 is part of a multipart bending tool which has, besides the gravity bending mould 1, a second lower mould 13. The second lower mould 13 is provided for an additional gravity bending step that follows the overpressure-assisted gravity bending according to the invention. The gravity bending mould 1 serves for the first pre-bending of the glass pane I, while the second lower mould 13 is provided for another, sharper bend. The second lower mould 13 likewise has a frame-like, concave supporting surface, but with a different curvature than the supporting surface 2 of the gravity bending mould 1. The second lower mould 13 is arranged within the gravity bending mould 1, which frames the second lower mould 13. The gravity bending mould 1 and the second lower mould 13 are vertically movable relative to one another. Initially, the gravity bending mould 1 is arranged above the second lower mould 13 such that the glass pane I rests on the supporting surface 2. Once the gravity bending is completed, the gravity bending mould 1 is moved vertically downward below the second lower mould 13. Thus, the glass pane I is transferred from the gravity bending mould 1 onto the second lower mould 13 (FIG. 3c). Since the curvature of the glass pane I at this time does not yet correspond to the curvature of the supporting surface of the second lower mould 13, the glass pane I rests initially only at points, typically in the region of the corners of the pane. This can result in an undesirable counter bending—the glass pane I is, so to speak, pressed upward at the support points, as a result of which, in the extreme case, a convex bend of the upper surface O is also produced locally. By means of the stronger bend of the corner regions in the previous gravity bending step, this effect can be compensated. The relevant regions of the glass pane I are excessively bent; the counter bending compensates the excessive bending, which results in the pane shape actually desired. Very complex pane shapes can be realised by the method according to the invention.

The bending method is depicted, by way of example, with reference to a single glass pane I. However, it can also be performed on two glass panes lying one atop the other, which are bent congruently together. This is particularly advantageous when the two glass panes are to be laminated later to form a composite glass pane.

FIG. 4 depicts another embodiment of the upper shaping tool 3 according to the invention during the method according to the invention. Here, as well, the cover 8 has a vertically running edge section 4. The shaping tool 3 is, however, implemented such that the vertical edge section 4 surrounds the glass pane 1 and the glass pane I is thus arranged in the hollow space. The optional sealing lip 7 extends from the edge section onto the surface O of the glass pane I.

This embodiment has the advantage that the upper shaping tool 3 need not be manufactured specifically for a certain pane type. Instead, even glass panes I of different sizes can be bent with the same shaping tool 3.

FIG. 5 depicts an exemplary embodiment of the method according to the invention with reference to a flowchart. An additional heating of the glass pane I and an additional gravity bending step on the second lower mould 13 follow the gravity bending depicted in FIG. 3 and the transfer onto the second lower mould 13.

A further bending step can follow the gravity bending, for example, a press bending step in accordance with EP 1836136 B1.

EXAMPLE

In a series of experiments, prior art gravity bending was compared to the overpressure-assisted gravity bending according to the invention with inhomogeneous pressure distribution. The extent of the so-called "counter bending" after the glass pane I had been transferred from the gravity bending mould 1 onto the second lower mould 13 was investigated. This effect was explained above in connection with the drawings. In the method according to the invention, the counter bending was counteracted by a higher overpressure in the corner regions of the glass pane I.

The mean counter bends measured are summarised in Table 1.

TABLE 1

| | Bending process | Counter bending |
|---|---|---|
| 1 | Prior art gravity bending | 0.7 mm |
| 2 | Gravity bending with an upper shaping tool 3 | 0.1 mm |

As indicated in the table, the undesirable counter bending is effectively reduced by the method according to the invention with the device according to the invention. In addition, the gravity bending is completed in less time by the overpressure assistance and is possible at lower temperatures. These are major advantages of the present invention.

LIST OF REFERENCE CHARACTERS (1) gravity bending mould
(2) supporting surface of the gravity bending mould 1
(3) upper shaping tool
(4) edge section of the shaping tool 3
(5.1) first subspace of the hollow space of the shaping tool 3
(5.2) second subspace of the hollow space of the shaping tool 3
(5.3) third subspace of the hollow space of the shaping tool 3
(6) gas feed line of the shaping tool 3 (inflow pipe)
(7) sealing lip of the shaping tool 3
(8) cover of the shaping tool 3
(9) felt/fleece of the sealing lip 7
(10) belt of the sealing lip 7
(11) deflector plate of the shaping tool 3
(12) separating wall in the hollow space of the shaping tool 3
(13) second lower mould
(I) glass pane
(O) upper surface of the glass pane I, facing away from the supporting surface 2
(Z) enlarged section of the shaping tool 3

The invention claimed is:

1. A device for bending a glass pane, comprising:
a gravity bending mould with a supporting surface, which is suitable for arranging a pane thereon; and
an upper shaping tool arranged opposite the supporting surface, the upper shaping tool being suitable for producing an overpressure on a top surface of the glass pane arranged on the supporting surface, the top surface facing away from the supporting surface,
wherein the shaping tool has a cover that forms a hollow space open in a direction of the gravity bending mould and is equipped with a common gas feed line for introducing a gas into the hollow space to produce overpressure,
wherein the hollow space is divided by a separating wall into at a first subspace and a second subspace such that a different pressure can be produced in at least two regions of the top surface, and
wherein the separating wall extends up to the common gas feed line,
wherein the separating wall
divides the cross-section of the common gas feed line into a first feed line sub-cross-section and a second feed line sub-cross-section, wherein gas is routed into the first subspace in the first sub-cross-section and gas is routed into the second subspace in the second sub-cross-section, and
divides a gas outlet cross-section of the hollow space into a first outlet sub-cross-section and a second outlet sub-cross-section, wherein gas is routed out of the first subspace through the first outlet sub-cross-section and gas is routed out of the second subspace through the second outlet sub-cross-section, and
wherein a ratio of the first feed line sub-cross-section to the second sub-cross-section is different from a ratio of the first outlet cross-section to the second outlet sub-cross-section.

2. The device according to claim 1, wherein the separating wall is arranged such that pressure produced in a region of a corner of the glass pane is higher than pressure produced in a central region of the glass pane.

3. The device according to claim 1, wherein the gravity bending mould has a frame-like, concave supporting surface.

4. The device according to claim 1, wherein the gravity bending mould can be moved vertically relative to a second lower mould to transfer the glass pane between the gravity bending mould and the second lower mould.

5. The device according to claim 1, wherein the shaping tool is equipped with a sealing lip arranged on an edge section of the cover for making contact with the top surface of the glass pane facing away from the supporting surface.

6. The device according to claim 5, wherein the sealing lip is made of a metal-containing felt or fleece with a belt arranged therein, the belt containing glass fibres and/or metal fibres.

7. The device according to claim 1, wherein the edge section is directed downward and is arranged substantially vertically.

8. The device according to claim 1, wherein the cover has a material thickness of at most 5 mm.

9. A method for bending a glass pane, comprising:
providing a gravity bending mould with a supporting surface;
providing a glass pane with a top surface having a first region and a second region;
arranging the glass pane facing away and on the supporting surface;
heating the glass pane to its softening temperature;
providing an upper shaping tool comprising a cover and a common gas feed line;
forming a hollow space open in a direction of the gravity bending mould using the cover;
providing a separating wall;
extending the separating wall up to the common gas feed line, thereby dividing the hollow space into first and second subspaces;
producing an overpressure on the top surface, thereby generating different pressure in the first region and in the second region of the top surface; and cooling the glass pane,
wherein the separating wall
divides the cross-section of the common gas feed line into a first feed line sub-cross-section and a second feed line sub-cross-section, wherein gas is routed into the first subspace in the first sub-cross-section and gas is routed into the second subspace in the second sub-cross-section, and
divides a gas outlet cross-section of the hollow space into a first outlet sub-cross-section and a second outlet sub-cross-section, wherein gas is routed out of the first subspace through the first outlet sub-cross-section and gas is routed out of the second subspace through the second outlet sub-cross-section, and
wherein a ratio of the first feed line sub-cross-section to the second sub-cross-section is different from a ratio of the first outlet cross-section to the second outlet sub-cross-section.

10. The method according to claim 9, wherein a pressure from 0 mbar to 15 mbar is produced in the first region and a pressure from 15 mbar to 30 mbar is produced in the second region.

11. The method according to claim 10, wherein the first region of the top surface includes a center of the pane and wherein the second region of the top surface includes a corner of the pane.

12. The method according to claim 9, further comprising, after the step of producing an overpressure on the top surface and before the step of cooling the glass:
providing a second lower mould;
moving the gravity bending mould downward vertically relative to the second lower mould, and
transferring the glass pane from the gravity bending mould to the second lower mould.

13. The method according to claim 12, further comprising, after the step of transferring the glass pane to the second lower mould and before cooling glass pane, subjecting the glass pane to further gravity bending on the second lower mould.

14. The method according to claim 9, wherein pressure from 2 mbar to 10 mbar is produced in the first region and a pressure from 20 mbar to 25 mbar is produced in the second region.

15. A method of using an upper shaping tool that has a cover that forms a hollow space open in the direction of the gravity bending mould for assisting a gravity bending process,
wherein an overpressure is produced on the top surface of a glass pane to be bent facing away from a gravity bending mould, by introducing a gas into the hollow space, and
wherein the hollow space is divided by a separating wall into first and second subspaces, the separating wall extending all the way to a common gas feed line of the shaping tool such that a different pressure is produced in two regions of the top surface,
wherein the separating wall
divides the cross-section of the common gas feed line into a first feed line sub-cross-section and a second feed line sub-cross-section, wherein gas is routed into the first subspace in the first sub-cross-section and gas is routed into the second subspace in the second sub-cross-section, and
divides a gas outlet cross-section of the hollow space into a first outlet sub-cross-section and a second outlet sub-cross-section, wherein gas is routed out of the first subspace through the first outlet sub-cross-section and gas is routed out of the second subspace through the second outlet sub-cross-section, and
wherein a ratio of the first feed line sub-cross-section to the second sub-cross-section is different from a ratio of the first outlet cross-section to the second outlet sub-cross-section.

* * * * *